US009031168B1

(12) United States Patent
Liu

(10) Patent No.: US 9,031,168 B1
(45) Date of Patent: May 12, 2015

(54) CONSTELLATION DESIGN AND OPTIMIZATION IN NON-LINEAR SATELLITE CHANNELS

(71) Applicant: Northrop Grumman Systems Corporation, Falls Church, VA (US)

(72) Inventor: Daniel N. Liu, Torrance, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days.

(21) Appl. No.: 14/257,740

(22) Filed: Apr. 21, 2014

(51) Int. Cl.
*H03D 3/22* (2006.01)
*H04L 27/34* (2006.01)

(52) U.S. Cl.
CPC .................................. *H04L 27/3483* (2013.01)

(58) Field of Classification Search
CPC ............. H04L 27/0008; H04L 27/34–27/389; H04L 25/08; H04B 1/10–1/14; H04B 1/1027–1/126; H04B 14/006; H04B 14/004; H03K 7/10
USPC .................................................. 375/298–309
See application file for complete search history.

(56) References Cited

U.S. PATENT DOCUMENTS

| | | | |
|---|---|---|---|
| 6,049,572 A | 4/2000 | Hansen | |
| 6,661,847 B1 | 12/2003 | Davis | |
| 6,674,811 B1 | 1/2004 | Desrosiers | |
| 7,088,784 B2 | 8/2006 | Borran | |
| 7,236,536 B2* | 6/2007 | Hochwald et al. | 375/265 |
| 7,239,668 B2 | 7/2007 | De Gaudenzi | |
| 7,761,777 B2 | 7/2010 | Lee | |
| 8,331,511 B2 | 12/2012 | Beidas | |
| 8,381,065 B2 | 2/2013 | Djordjevic | |
| 2007/0133718 A1* | 6/2007 | Lee et al. | 375/341 |
| 2012/0287801 A1* | 11/2012 | Wulich et al. | 370/252 |
| 2012/0307933 A1* | 12/2012 | Djordjevic et al. | 375/295 |

OTHER PUBLICATIONS

Hager, Christian, "Design of APSK Constellations for Coherent Optical Channels with Nonlinear Phase Noise" IEEE, arXiv:1209.5221v2 [cs.IT], Jun. 12, 2013, pp. 1-11.
Kayhan, Farbod, "Constellation Design for Transmission over Nonlinear Satellite Channels" arXiv:1210.1762v1 [cs.IT], Oct. 5, 2012, 7 pgs.
Freckmann, T. "Fiber Capacity Limits with Optimized Ring Constellations" IEEE Photonics Technology Letters, vol. 21, No. 20, Oct. 15, 2009, pp. 1496-1498.

* cited by examiner

*Primary Examiner* — Dac Ha
*Assistant Examiner* — Janice Tieu
(74) *Attorney, Agent, or Firm* — John A. Miller; Miller IP Group, PLC

(57) ABSTRACT

A method for optimizing a constellation for M-ary amplitude phase shift keying (M-APSK) that provides signal modulation for transmitting a series of digital bits in an analog signal by a transmitter to be received by a receiver over a communications channel. The method includes identifying symbol-wise mutual information of a transmitted constellation, where the symbol-wise mutual information includes a conditional probability density function. The method identifies an unconstrained capacity that defines an ultimate performance limit of the constellation, and minimizes a difference between a rate of the symbol-wise mutual information and a rate of the unconstrained capacity to determine the number of rings, the number of symbols in each ring and the ring ratio in the constellation.

20 Claims, 2 Drawing Sheets

CONSTELLATION DESIGN AND OPTIMIZATION IN NON-LINEAR SATELLITE CHANNELS

GOVERNMENT CONTRACT

The Government of United States of America has rights in this invention pursuant to a U.S. Government contract.

BACKGROUND

1. Field

This invention relates generally to a system and method for optimizing a constellation for digital signal coding and transmission and, more particularly, a system and method for optimizing a constellation for digital signal coding and transmission for a satellite communications channel that employs minimizing a difference between a rate of symbol-wise mutual information between a transmitted constellation symbol and a rate of an unconstrained capacity to determine the number of rings, the number of symbols in each ring, and the ring ratio in the constellation.

2. Discussion

Satellite communications is seeing a growing demand for greater throughput and transponders with more DC power efficiency. To provide greater spectral efficiency, satellite communications systems often employ modern coding and modulation, which is best exemplified by the known digital video broadcasting (DVB)-S2 standard and protocol. Code concatenation is an effective way to achieve large coding gains while maintaining the decoding complexity to be manageable. However, ever since the discovery of "turbo-codes" it has been widely acknowledged that the iterative processing techniques are not limited to conventional concatenated error correction codes, and the so-called "turbo principle" is more generally applicable to many other components found in modern digital communications. One such example is iterative de-mapping and decoding in coded modulation communication systems. Coded M-ary amplitude phase shift keying (M-APSK) is the "de-facto" bandwidth-efficient modulation technique for digital satellite communications.

In order to meet the radiated power demands necessary for the signal transmission distances, satellite communications systems employ high power amplifiers (HPAs), such as traveling-wave tube amplifiers (TWTAs) and solid-state power amplifiers (SSPA). To provide high throughput and increased efficiency, these HPAs often operate at or near their saturation level, which often results in severe non-linear distortions of the transmitted signal that has a reverse effect on the throughput and performance of the communications channel. M-APSK provides a power- and spectral-efficient solution with its inherent robustness against highly non-linear distortion. However, the implementation of satellite communications channels still provides significantly different design challenges from traditional terrestrial channels due to their dominant non-linear behavior.

DETAILED DESCRIPTION OF THE EMBODIMENTS

The following discussion of the embodiments of the invention directed to a system and method for optimizing a constellation design for digital signal coding and transmission is merely exemplary in nature, and is in no way intended to limit the invention or its applications or uses. For example, as discussed herein, the invention has particular application for optimizing a constellation for digital satellite signal channels using high power amplifiers. However, as will be appreciated by those skilled in the art, the invention will have application for any type of communications signal of this type.

The present invention concerns constellation design, optimization and efficient implementation for iterative coded modulation of a digital signal in non-linear satellite communications channels. Constellation encoding refers to mapping binary data bits into Euclidean in-phase and quadrature phase symbols to provide an effective technique for converting a digital signal to an analog signal for transmission. As will be discussed below, the present invention optimizes the constellation for a particular M-APSK modulation technique to increase the number of bits that can be transmitted over a particular channel.

Figure 1:
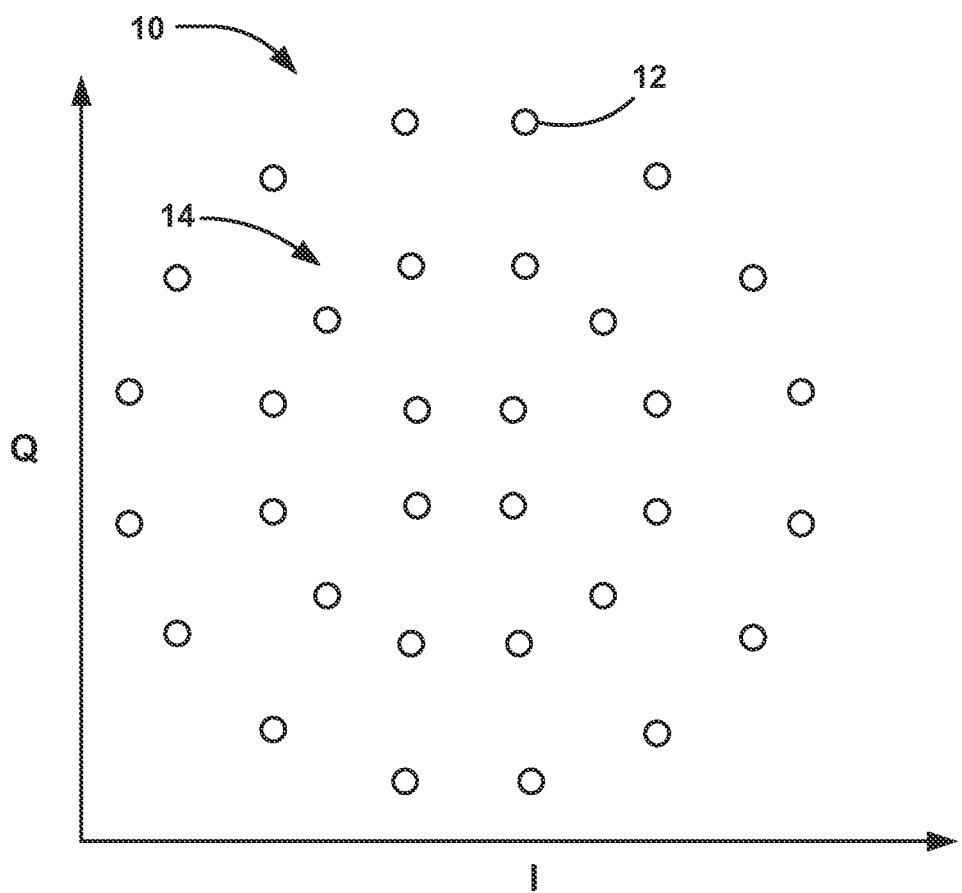
FIG. 1 is an illustration of a digital signal constellation including rings of symbols.

FIG. 1 is an illustration of a complex coded digital signal constellation 10 where in-phase values are on the horizontal axis and quadrature-phase values are on the vertical axis. The constellation 10 includes an array of points or symbols 12, where each symbol 12 represents a number of bits depending on the M-APSK modulation order, and where a number of the symbols 12 are provided in concentric rings 14, here three rings, around a common center. The number of the rings 14 and the number of the symbols 12 in each ring 14 defines the constellation design for bit-to-symbol mapping of the digital signal, as will be discussed in further detail below. As the number of transmitted bits increases as the modulation order increases as well. For example, in 8-APSK, 16-APSK, 32-APSK, 64-ASPK, etc., the number of the symbols 12 in the constellation 10 to identify those bits also increases to provide the amplitude phase-shift keying for in-phase and quadrature-phase signals. For example, 8-APSK modulation may only require eight symbols 12 in a single ring. As more of the symbols 12 are required, which generally requires more of the rings 14, the relative distance between the rings 14 will change.

Figure 2:
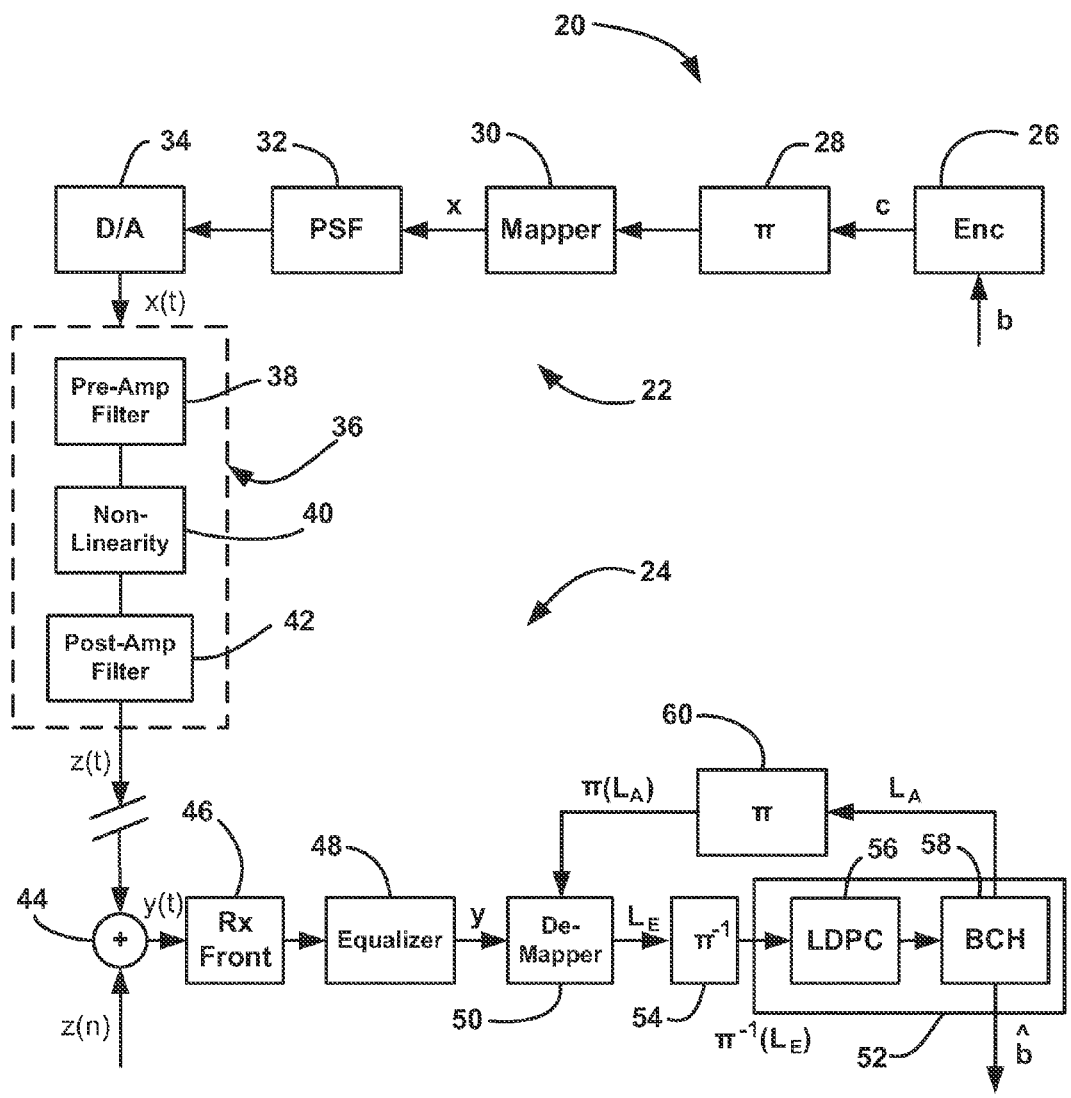
FIG. 2 is a block diagram of a satellite communications system employing iterative de-mapping and decoding.

The present invention can be described in connection with a single-input, single-output point-to-point coded communications signal over a non-linear satellite channel, such as a satellite channel provided by satellite communications system 20 shown in FIG. 2. The satellite communications system 20 includes a transmitter 22 and a receiver 24, where the transmitter 22 and the receiver 24 can be either on the satellite or at a ground station. The transmitter 22 includes an encoder 26 that receives a signal b having a stream of bits to be transmitted, where the encoder 26 encodes the signal b depending on the particular architecture being employed, for example, the DVB-S2 protocol, and generates a coded bit sequence signal $c=[c_1 \ldots c_{KM_c}]^T$. The coded digital signal c from the encoder 26 is sent to an interleaver 28 that redistributes the sequence of bits in the coded bit sequence signal c to increase the performance of the transmitter 22 by reducing the chance that bursty errors corrupt a group of bits that would exceed the systems error correction coding capability.

The interleaved bit signal from the interleaver 18 is then sent to a mapper 20 that translates and modulates the interleaved bits into a constellation having rings of symbols, where each symbol defines a group of bits as discussed above. For the example being discussed herein, the mapper 20 may employ M-ary amplitude phase shift keying (APSK) that provides in-phase and quadrature-phase bits for each symbol that is transmitted. More particularly, $M_c$ consecutive bits of c are grouped to form a subsequence of bits $c_k=[c_k(1), \ldots, c_k$ ($M_c$)]. Each sequence of bits $c_k$ is then mapped to a complex symbol $x(k)=\mu(c_k)$ by bit-to-symbol mapping $\mu$. The coded modulation spectral efficiency is $R=rM_c$, where r is the actual coding rate. General APSK constellations are composed of $n_R$ concentric rings, each with uniformly spaced PSK symbols. The signal constellation points (symbols) x are complex numbers that are drawn from a constellation set X given by:

$$X \begin{cases} r_1 e^{j\left(\frac{2\pi}{n_1}i+\theta_1\right)}; i = 0, \ldots, n_1 - 1 (\text{ring } 1) \\ r_2 e^{j\left(\frac{2\pi}{n_2}i+\theta_2\right)}; i = 0, \ldots, n_2 - 1 (\text{ring } 2) \\ \vdots \\ r_{n_R} e^{j\left(\frac{2\pi}{n_R}i+\theta_R\right)}; i = 0, \ldots, n_{R-1} (\text{ring } n_R) \end{cases} \quad (1)$$

where $n_l$, $r_l$ and $\theta_l$ denote the number of points (symbols) in a ring, the radius of the ring and the relative phase shift corresponding to l-th ring, respectively. It is assumed that the constellation X is normalized in energy, i.e., $E[|X|^2]=1.0$, which implies that the radii $r_l$ are normalized such that $$\frac{1}{|x|}\sum_{l=1}^{n_R} n_l r_l^2 = 1.$$

As will be discussed in detail below, the present invention optimizes the configuration of the rings and symbols in the constellation for optimal transmission performance. The output of the mapper 20 is a sequence of in-phase and quadrature-phase complex values, where each group of values identifies one of the symbols in the constellation. In this example, the coded bit sequence signal $c=[c_1 \ldots c_{KM_c}]^T$ is mapped into a block of K coded symbols x that generates a set of K-coded information symbols $x=[x(1) \ldots x(K)]^T$. It is assumed that the symbols are equally likely chosen from a complex constellation X with cardinality $|X|=2^{M_c}$, where the cardinality $|X|$ is the number of points in the set of x ordered constellation symbols, which have an average symbol energy $E_x \equiv E|x(k)|^2$.

The signal c is provided to a square-root raised cosine (SRRC) pulse-shaping filter (PSF) 22 that interpolates the symbol sequence and shapes the signal as a raised cosine for converting the digital signal to an analog signal. The filtered symbols are then converted to an analog signal by a digital-to-analog (D/A) converter 34 for transmission. The analog output signal from the D/A converter 34 is the baseband equivalent of the transmitted signal at time t, where the signal x(t) and can be represented by:

$$x(t)=\sqrt{P}\Sigma_{k=0}^{\infty}x(k)p(t-kT_s), \quad (2)$$

where P is the average signal power, x(k) is the k-th transmission symbol, chosen from a complex amplitude phase shift keying (APSK) constellation X with equally-likely symbols and cardinality $|X|=2^{M_c}$, and p(t) is the SRRC transmission filter impulse response.

The analog output signal x(t) from the D/A converter 34 is sent to a high power amplifier (HPA) 36 in the transmitter 22 for transmission. The HPA 36 includes a pre-amplifier filter 38 that filters the signal x(t) and provides the filtered signal to a memoryless non-linearity amplifier 40 for amplification. The amplified signal is then filtered by a post-amplifier filter 42 before it is transmitted by the transmitter 22 from the satellite or the ground station as a discrete-input/discrete-output symbol sequence analog signal.

The receiver 24 receives an analog symbol sequence signal z(t) from the HPA 36 at the ground station, or otherwise, where additive white Gaussian noise (AWGN) z(n) is added to the received signal z(t) to provide modeling for thermal background noise at a summation junction 44 to provide signal y(t), which is a linearly corrupted version of the signal x(t). The signal y(t) is provided to a receiver front-end 46 where the analog signal y(t) is down-converted and the carrier signal is removed. The signal y(t) from the front-end 46 is converted to a digital signal y by an equalizer 48 in a manner that is well understood by those skilled in the art. The equalizer 48 recovers a one sample per symbol version of the digital signal that provides a symbol having an in-phase and quadrature-phase value on the constellation. After receiver RF processing, equalization and sampling at $kT_S$, the received discrete-input discrete-output symbol sequence is:

$$y(k)=x(k)+z(k)$$

where $z(k) \sim X_c(0,N_0)$ is the corresponding noise sample.

The digital signal y from the equalizer 48 is provided to an inner soft-input/soft-output (SISO) de-mapper 50 that outputs the bits in each particular symbol in the constellation. The de-mapper 50 calculates an a posteriori log-likelihood ratio (LLR) $L_D$ for each bit, separates a priori LLR information $L_A$ fed back from an outer channel decoder 52 and provides extrinsic LLR information $L_E$. The SISO de-mapper 50 takes the channel observation, y, i.e., time index k is dropped for brevity, and provides the a priori log-likelihood ratio (LLR), $L_A(c_n)$, to compute the extrinsic information, $L_E(c_n)$, per received y. The a posteriori LLR $L_D(c_n|y)$ for bit $c_n$, conditioned on received vector y, is similarly defined as:

$$L_D(c_n|y) \equiv \ln\frac{P[c_n = +1|y]}{P[c_n = -1|y]}, \quad (4)$$

where $P[c_n=\pm 1]$ is the a posteriori probability (APP) of bit $c_n$.

Achieving better performance with minimal complexity relies on iterative processing between de-mapping and decoding. The "new" (extrinsic) information learned by the de-mapper 50 can easily be separated from the a posteriori LLR $L_D(c_n)$ by subtracting off the a priori LLR $L_A(c_n)$ as:

$$L_E(c_n)=L_D(c_n|y)-L_A(c_n) \quad (5)$$

The extrinsic information $L_E(c_n)$ is then sent to the outer channel decoder 52 as a priori information on the coded bit $c_n$ in equation (5). Analogous to a turbo-decoder, the inner SISO de-mapping provided by the de-mapper 50 and the outer channel decoder 50 can be regarded as two elementary "decoders" in a serial concatenated architecture. An inverse interleaver 54 removes the bit interleaving provided by the interleaver 28 in the transmitter 22. The inverse interleaver 54 provides a deinterleaved signal $\pi^{-1}(L_E)$ to the outer channel decoder 52 that generates a decoded digital signal $\hat{b}$. The outer decoder 52 employs an R=2/3 low density priority code (LDPC) 56 and a BCH 52, where the highest variable node (VN) to check node (CN) connections are concentrated in the beginning of the party check matrix H to provide error correction. The outer channel decoder 52 sends the a priori LLR $L_A$ to an interleaver 60 that provides the same interleaving as the interleaver 28 to provide an interleaved signal $\pi(L_A)$ to the de-mapper 50 for feedback purposes. Thus, the de-mapper 50 subtracts the a priori LLR $L_A$ that is known by the decoder 52 from the a posteriori LLR $L_D$ to generate the LLR $L_E$ that is unknown by the decoder 52.

Examining the code modulation scheme proposed by the DVB-S2 protocol reveals a compelling interaction between the de-mapper 50, the interleaver/de-interleaver 54, 60 and the outer decoder 52. In contrast to the previously reported literature, where performance of coded modulation is maximized by only considering the constellation ring ratio, such interaction among individual components discussed above provides opportunities for improved design. Considering symbol-wise mutual information (discussed below), i.e., symmetric information rate (SIR), the bit-wise mutual information and the sum rate-parallel decoding capacity, i.e., the SR-PD capacity and the sum of the bit-wise mutual information, for an 8-APSK constellation, and bit-to-symbol mapping, and considering each bit as an independent binary channel, it has been observed that "bit 0" has the smallest channel capacity among all the bit-wise binary channels. Thus, the "bit 0" channel is referred to as the "weakest link".

A simple interleaver/de-interleaver enables matching between the "weakest link", i.e., the bit 0 channel, with the strongest protection from the LDPC 56. The above example reveals an important fact that to truly optimize the performance of any coded modulation, the design parameters that are jointly considered should include the de-mapper 50 for the constellation, bit-to-symbol mapping and efficient hardware implementation, the interleaver/de-interleaver 54, 60 for providing rule of interleaving, and the encoder 52 for providing LDPC design.

The present invention proposes a technique for designing and selecting an optimal M-APSK constellation based on the discussion above. Specifically, constellation optimization of a transmission channel for a digital signal is provided by maximizing the symbol-wise mutual information by finding the optimal ring ratio at the particular transmission rate (bits/sec/Hz) of interest. The symbol-wise mutual information I(X; Y) is channel dependent, for example, AWGN channel dependent, and provides a practical performance limit for an iterative de-mapping and decoding (IDD) scheme having a given constellation. The mutual information between the transmitted constellation symbol X and the received AWGN channel output Y is:

$$I(X;Y) = \frac{1}{|X|}\sum_{i=1}^{|X|}\int_{-\infty}^{+\infty} p(y|X=x_i) \times \log_2 \frac{p(y|X=x_i)}{p(y)} dy, \quad (6)$$

where the conditional probability density function (PDF) is a Gaussian distribution defined:

$$p(y|X=x_i) = \frac{1}{\pi N_0} e^{-\frac{\|y-x_i\|^2}{N_0}}, \quad (7)$$

and where:

$$p(y) = \frac{1}{|X|}\sum_{i=1}^{|X|} p(y|X=x_i). \quad (8)$$

The symbol-wise mutual information I(X; Y) is often referred to as the symmetric information rate (SIR) or constrained capacity for the underlying constellation. The unconstrained capacity or Shannon capacity $C \equiv \log_2(1+SNR)$ serves as the ultimate performance limit, which assumes a Gaussian input distribution. If R denotes the achievable information rate, channel coding theory guarantees a reliable communication if, and only if, $I(X;Y) \geq R$. Evaluating R=2 bits/sec/Hz yields $I(X;Y)|_{R=2} \approx 2.768$ dB as the lowest $E_b|N_0$ for which error-free communications is possible.

Maximizing the symbol-wise mutual information I(X; Y) relies solely on constellation optimization. As shown in equation (6), the symbol-wise mutual information I(X; Y) is strictly a function of constellation labels, i.e., actual Euclidean coordinates of symbols, and is independent of bit-to-symbol mapping. Generally, given a target information rate R, M-APSK constellation optimization can be succinctly described in the following optimization problem.

minimize $I(X;Y)|_R - C|_R$ subject to $$\frac{1}{|X|}\sum_{l=1}^{n_R} n_l r_l^2 = 1.0, \quad (9)$$

$\Sigma_{l=1}^{n_R} n_l = |X|$.

In equation (9), the constraint $$\frac{1}{|X|}\sum_{l=1}^{n_R} n_l r_l^2 = 1.0$$

shows that the power transmitted by the constellation is normalized to 1, and the constraint $\Sigma_{l=1}^{n_R} n_l = |X|$ shows that the number of symbols to be used in the constellation cannot exceed the cardinality |X| of the constellation. Conventionally, the ring radius $r_l$ and the phase shift $\theta_l$ are defined in relative terms, where $\rho_l = r_l/r_1$ for $l=1, \ldots, n_R$ is the relative radius of the lth ring with respect to the ring radius $r_1$ and $\phi_l = \theta_l - \theta_1$ for $l=1, \ldots, n_R$ is the relative phase shift of the lth ring with respect to the inner ring. In particular, $\rho_1 = 1$ and $\phi_1 = 0$. Equation (9) represents a hybrid discrete and continuous multi-dimensional optimization problem with a potential solution space over the number of the rings $n_R$, the number of symbols per ring $n=[n_1, \ldots, n_{n_R}]$, and the relative ring ratios $\rho=[1.0, p_2 \ldots p_{n_R}]$. The empirical evidence suggests that the symbol-wise mutual information I(X; Y) does not depend on $\phi=[0.0, \phi_2, \ldots, \phi_{n_R}]$. Searching for the truly global optimal solution of equation (9), which has the form of $(n_R^*, n^*, \rho^*)$, is difficult and the subject of current on-going investigation. Practical "semi-optimal" solutions reduce the potential solution space to only the ring ratio $\rho$ by limiting the other two search dimensions to a few potential candidates. Previous studies have reported optimized constellations for 16-APSK and 32-APSK. Very limited results are available for higher order M-APSK, such as 64-APSK and 128-APSK.

Practical M-APSK constellation optimization also takes system non-linearity into account. The somewhat simplified communications system model presented in FIG. 2 provides a good bench-mark for a linearly distorted satellite communications channel. More accurate non-linearity modeling relies on a Volterra series description. It is interesting to realize that the symbol-wise mutual information I(X; Y) can be numerically evaluated based on the discrete Volterra series and the optimization process in equation (9) remains the same. The conditional PDF $p(y|X=x_i)$ can be numerically evaluated according to specific nonlinear channel condition.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for optimizing a constellation for M-ary amplitude phase shift keying (M-APSK) to provide signal modulation for transmitting a series of digital bits as an analog signal over a communications channel, said constellation optimization is defined by number of rings in the constellation, number of symbols in each ring, where each symbol represents a plurality of bits, and a ring ratio that is the ratio of the radius of two rings, said method comprising:
identifying symbol-wise mutual information between a transmitted constellation symbol and a received constellation symbol, said symbol-wise mutual information including a conditional probability density function;
identifying an unconstrained capacity able to be achieved by the constellation, said unconstrained capacity defining an ultimate performance limit of the constellation; and
minimizing a difference between a rate of the symbol-wise mutual information and a rate of the unconstrained capacity to determine the number of rings, the number of symbols in each ring and the ring ratio.

2. The method according to claim 1 wherein identifying the symbol-wise mutual information includes using the equations:

$$I(X;Y) = \frac{1}{|X|}\sum_{i=1}^{|X|}\int_{-\infty}^{+\infty} p(y|X=x_i) \times \log_2 \frac{p(y|X=x_i)}{p(y)} dy,$$

where the conditional probability density function (PDF) is:

$$p(y|X=x_i) = \frac{1}{\pi N_0} e^{-\frac{\|y-x_i\|^2}{N_0}},$$

and where:

$$p(y) = \frac{1}{|X|}\sum_{i=1}^{|X|} p(y|X=x_i).$$

and where x and y are signal channel observations, X and Y are channel symbol-wise information for the channel observations x and y, i is a particular sample point, $N_0$ is a noise sample, and p is a square-root raised cosine (SRRC) transmission filter impulse response.

3. The method according to claim 1 wherein minimizing the difference between the rate of symbol-wise mutual information and the rate of the unconstrained capacity is subject to a first constraint that a power transmitted by the constellation is normalized to 1 and a second constraint that the number of symbols in the constellation cannot exceed a cardinality of the constellation.

4. The method according to claim 3 wherein the power transmitted by the constellation being normalized to 1 constraint is defined by:

$$\frac{1}{|X|}\sum_{l=1}^{n_R} n_l r_l^2 = 1.0$$

where |X| is the cardinality, $n_R$ is the number of rings, $n_l$ is the number of symbols in the ring, $r_l$ is the radius of the ring, and l is the ring number.

5. The method according to claim 3 wherein the number of symbols in the constellation cannot exceed a cardinality of the constellation constraint is defined by:

$$\Sigma_{l=1}^{n_R} n_l = |X|$$

where |X| is the cardinality, $n_R$ is the number of rings, and $n_l$ is the number of symbols in the ring.

6. The method according to claim 1 wherein identifying the unconstrained capacity includes identifying the unconstrained capacity as $C=\log_2(1+SNR)$, where SNR is signal-to-noise ratio.

7. The method according to claim 1 wherein minimizing the difference between the rate of the symbol-wise mutual information and the rate of the unconstrained capacity is performed in an inner soft-input/soft-output de-mapper.

8. The method according to claim 1 wherein the communications channel is an additive white Gaussian noise (AWGN) channel.

9. The method according to claim 1 wherein the communications channel is a satellite communications channel.

10. A method for optimizing a constellation for transmitting a series of digital bits as an analog signal by a transmitter to be received by a receiver over a satellite communications channel, said method comprising:
identifying symbol-wise mutual information between a transmitted constellation symbol and a received constellation symbol;
identifying an unconstrained capacity able to be achieved by the constellation, where the unconstrained capacity defines an ultimate performance limit of the constellation; and
minimizing a difference between a rate of the symbol-wise mutual information and a rate of the unconstrained capacity to determine a number of rings, a number of symbols in each ring and a ring ration for the constellation.

11. The method according to claim 10 wherein identifying symbol-wise mutual information includes identifying the symbol-wise mutual information to include a conditional probability density function.

12. The method according to claim 11 wherein identifying the symbol-wise mutual information includes using the equations:

$$I(X;Y) = \frac{1}{|X|} \sum_{i=1}^{|X|} \int_{-\infty}^{+\infty} p(y\,|\,X=x_i) \times \log_2 \frac{p(y\,|\,X=x_i)}{p(y)}\,dy,$$

where the conditional probability density function (PDF) is:

$$p(y\,|\,X=x_i) = \frac{1}{\pi N_0} e^{-\frac{\|y-x_i\|^2}{N_0}},$$

and where:

$$p(y) = \frac{1}{|X|} \sum_{i=1}^{|X|} p(y\,|\,X=x_i).$$

and where x and y are signal channel observations, X and Y are channel symbol-wise information for the channel observations x and y, i is a particular sample point, $N_0$ is a noise sample, and p is a square-root raised cosine (SRRC) transmission filter impulse response.

13. The method according to claim 10 wherein minimizing the difference between the rate of symbol-wise mutual information and the rate of the unconstrained capacity is subject to a first constraint that a power transmitted by the constellation is normalized to 1 and a second constraint that the number of symbols in the constellation cannot exceed a cardinality of the constellation.

14. The method according to claim 10 wherein the transmitted digital bits are modulated using M-ary amplitude phase shift keying (M-APSK).

15. The method according to claim 10 wherein the satellite communications channel is an additive white Gaussian noise (AWGN) channel.

16. A communications system comprising:
a transmitter including a mapper that translates and modulates a series of bits into constellations having rings of symbols, where each symbol defines a group of bits and where the constellation defines the symbols as in-phase and quadrature-phase complex values, said transmitter transmitting the constellations on an analog signal; and
a receiver responsive to the analog signal including the constellations from the transmitter, said receiver including a de-mapper that converts the received symbols into a stream of digital bits representative of the transmitted bits, wherein the mapper optimizes the constellation by identifying symbol-wise mutual information between the transmitted constellation symbols and the received constellation symbols, identifies an unconstrained capacity able to be achieved by the constellation, and minimizes a difference between a rate of the symbol-wise mutual information and a rate of the unconstrained capacity to determine number of rings, number of symbols in each ring and a ring ratio for each constellation.

17. The system according to claim 16 wherein the mapper identifies the symbol-wise mutual information to include a conditional probability density function.

18. The system according to claim 17 wherein the mapper identifies the symbol-wise mutual information using the equations:

$$I(X;Y) = \frac{1}{|X|} \sum_{i=1}^{|X|} \int_{-\infty}^{+\infty} p(y\,|\,X=x_i) \times \log_2 \frac{p(y\,|\,X=x_i)}{p(y)}\,dy,$$

where the conditional probability density function (PDF) is:

$$p(y\,|\,X=x_i) = \frac{1}{\pi N_0} e^{-\frac{\|y-x_i\|^2}{N_0}},$$

and where:

$$p(y) = \frac{1}{|X|} \sum_{i=1}^{|X|} p(y\,|\,X=x_i).$$

and where x and y are signal channel observations, X and Y are channel symbol-wise information for the channel observations x and y, i is a particular sample point, $N_0$ is a noise sample, and p is a square-root raised cosine (SRRC) transmission filter impulse response.

19. The system according to claim 16 wherein the mapper minimizes the difference between the rate of symbol-wise mutual information and the rate of the constrained capacity is subject to a first constraint that a power transmitted by the constellation is normalized to 1 and a second constraint that the number of symbols in the constellation cannot exceed a cardinality of the constellation.

20. The system according to claim 16 wherein the transmitted digital bits are modulated using M-ary amplitude phase shift keying (M-APSK), and wherein a communications channel is an additive white Gaussian noise (AWGN) channel.

* * * * *